(12) United States Patent
Okamoto et al.

(10) Patent No.: US 9,387,563 B2
(45) Date of Patent: Jul. 12, 2016

(54) MACHINE TOOL

(71) Applicant: DMG MORI SEIKI CO., LTD., Nara (JP)

(72) Inventors: Yoichi Okamoto, Nara (JP); Eiichiro Gomi, Nara (JP); Hiroki Nakao, Nara (JP)

(73) Assignee: DMG MORI SEIKI CO., LTD., Nara (JP)

( * ) Notice: Subject to any disclaimer, the term of this patent is extended or adjusted under 35 U.S.C. 154(b) by 462 days.

(21) Appl. No.: 14/101,516

(22) Filed: Dec. 10, 2013

(65) Prior Publication Data
US 2014/0174774 A1 Jun. 26, 2014

(30) Foreign Application Priority Data

Dec. 26, 2012 (JP) ................. 2012-282326

(51) Int. Cl.
*B23Q 17/00* (2006.01)
*B23Q 11/08* (2006.01)

(52) U.S. Cl.
CPC .......... *B23Q 17/007* (2013.01); *B23Q 11/0891* (2013.01); *B23Q 17/00* (2013.01)

(58) Field of Classification Search
CPC ............. G01M 3/04; E06B 3/32; A47H 1/00; B23Q 17/007

USPC .............................................. 173/2, 20; 73/46
See application file for complete search history.

(56) References Cited

U.S. PATENT DOCUMENTS

| 4,635,469 A | * | 1/1987 | Modera | G01M 3/3236 73/40 |
| 5,367,754 A | * | 11/1994 | Sheehan | B23B 3/161 29/27 C |
| 5,559,282 A | * | 9/1996 | Knight | G01M 3/12 73/38 |

FOREIGN PATENT DOCUMENTS

JP    H03166037 A    7/1991

* cited by examiner

*Primary Examiner* — Nathaniel Chukwurah
(74) *Attorney, Agent, or Firm* — Miller, Mathias & Hull LLP

(57) ABSTRACT

A machine tool has a cover body with a window, the window including two spaced window plates defining an airtight space therebetween. The space is brought to a pressure other than atmospheric. An indicator is coupled to the cover body and has an indicator portion that is displaced in response to pressure in the space. The indicating portion is visually observable from outside the machine tool, so that the airtightness of the window may be determined by visually observing the position of the indicating portion.

10 Claims, 8 Drawing Sheets

MACHINE TOOL

FIELD OF THE DISCLOSURE

The present disclosure generally relates to machine tools, and more particularly to machine tools having windows with two window plates joined together in airtight fashion and an indicator for detecting an airtight state of the window.

BACKGROUND OF THE DISCLOSURE

Usually, taking into consideration safety and environmental aspects, a machine tool is provided with a cover body for dividing a machining region from an external region and the cover body is provided with a window so that the machining region can be observed from the outside thereof. Japanese Unexamined Patent Application Publication No. 3-166037 discloses a conventional example of such a cover body having a window. The cover body (specifically, a slide door) disclosed in this document is made of a plate-shaped polycarbonate and has a structure in which a glass plate is attached to the inside (the machining-region side) of a portion to be a window thereof.

According to this cover body, because the polycarbonate plate constituting the cover body has very high toughness and high impact resistance, for example, even if an unexpected accident in which a tool collides with a workpiece due to an operation error or an error in program generation, it is possible to completely prevent the tool and the workpiece from shooting out of the machining region due to the collision.

While a polycarbonate plate has high toughness and high impact resistance as described above, its hardness is not so high, that is, its wear resistance is not so high, and therefore a polycarbonate plate has a disadvantage that, when chips generated by cutting or the like hit its surface, its surface is shaved by the chips and becomes rough, thereby resulting in deterioration in transparency (visibility) therethrough, for example.

Therefore, in the above conventional cover body, in order to prevent the surface of the polycarbonate plate from becoming rough due to chips and maintain good visibility therethrough, a structure is employed in which a glass plate having high wear resistance is attached to the inside (the machining-region side) of a portion to be a window of the polycarbonate plate.

Thus, according to the conventional cover body having the above-described structure, the glass plate arranged on the machining-region side makes it possible to prevent deterioration in visibility (good observability from the outside), which is caused by chips, and the polycarbonate plate having high toughness and high impact resistance makes it possible to completely prevent the tool and the workpiece from shooting out of the machining region, thereby securing high safety.

More recently, it has been found that the polycarbonate plate has, besides the disadvantage that it has low wear resistance, a disadvantage that it has low resistance to coolant and, if it is in contact with coolant for a long time, its high toughness and high impact resistance, which are its advantages, are reduced.

Therefore, at present, the cover body except for the window is made of sheet metal and the window employs a structure in which a glass plate and a polycarbonate plate are arranged on the machining-region side and the external side, respectively, and they are airtightly joined together with a certain distance between them for compensating the above-mentioned disadvantage.

According to the window having such a structure, the polycarbonate plate is prevented from coming into contact with coolant and it is therefore possible to prevent the toughness and the impact resistance of the polycarbonate plate from being reduced due to coolant.

SUMMARY OF THE DESCRIPTION

However, even the window having the structure in which the glass plate and the polycarbonate plate are airtightly joined together with a certain distance between them has a problem as described below.

That is, although the airtightness of the joined portion between the glass plate and the polycarbonate plate of the window is secured, coolant is not allowed to enter between the glass plate and the polycarbonate plate and therefore the reduction of toughness and impact resistance of the polycarbonate plate due to coolant does not occur, the airtightness has not been fully ensured conventionally.

For example, conventionally, a method of detecting the airtightness between the glass plate and the polycarbonate plate in manufacturing the window has not been suggested, and therefore, in the present circumstances, it cannot be said that the airtightness is fully ensured at the time of manufacturing. Further, even if the airtightness is ensured at the time of manufacturing, it is possible that a seal member does not have sufficient resistance to coolant, and in this case there is the fear that the airtightness is lowered by deterioration over time of the seal member.

Furthermore, various loads act on the window during machine tool operation. For example, a load acts on the window due to an operation of sliding the cover body and a load also acts on the window due to collision of chips or coolant therewith. Further, a load also acts on the window due to deflection caused by cutting heat or heat transmitted from various sources of heat generation. Such loads deform the window and, if such deformation is repeated for a long time, the airtightness of the joined portion can be lowered. Further, in some cases, an excessive load acts on the glass plate and thereby causes a crack therein and the airtightness is therefore lowered. Thus, in the window having the above-described structure, the airtightness thereof has not been fully ensured conventionally.

Although naturally the polycarbonate plate has a determined useful life and the window is to be replaced on a regular basis, there is the fear that, if coolant enters between the glass plate and the polycarbonate plate due to poor airtightness and the polycarbonate plate thereby falls into a situation where it comes into contact with the coolant, the polycarbonate plate deteriorates earlier than scheduled and its toughness and impact resistance are remarkably reduced before the replacement. If the above-described unexpected accident happens in this situation, a serious accident in which the tool or the workpiece penetrates the window comprising the glass plate and the polycarbonate plate and shoots out of the machining region might be caused.

Accordingly, machine tool embodiments are disclosed herein that enable the machine tool operator to visibly determine, with his or her eyes, the integrity of the airtight state of the window.

To achieve this, certain embodiments disclosed herein relate to a machine tool having a cover body with a window, wherein:
  the window comprises two transparent or translucent window plates which are airtightly joined together with a certain distance between them,
  the pressure in a space between the window plates is set to a pressure other than atmospheric pressure, and an indicator having an indicating portion which is displaced in accordance with pressure is disposed on or connected to the cover body so that the pressure in the space acts on the indicating portion and the indicating portion can be visually observed (detected with eyes) from the outside.

According to this disclosure, first of all, the pressure in the space is set to a pressure other than atmospheric pressure, that is, the pressure in the space is increased to a pressure higher than atmospheric pressure or is reduced to a pressure lower than atmospheric pressure. When the space is brought into a pressurized state or a pressure-reduced state in this way, the pressure in the space acts on the indicating portion of the indicator and thereby the indicating portion is displaced and is positioned at a position corresponding to this initial pressure.

Thereafter, although the pressure in the space does not vary when the airtight state of the window is good, the pressure in the space varies when the airtightness of the window is not maintained in a good state, that is, the pressure is reduced in the case where the space has been brought into a pressurized state, and the pressure is increased in the case where the space has been brought into a pressure-reduced state. In accordance with this pressure variation, the position of the indicating portion is displaced from its initial position. Therefore, it is possible to judge appropriateness of the airtight state of the space by checking with eyes whether the indicating portion is displaced from its initial position.

The indicating portion may be configured to be movable between a visible region which can be visually observed from the outside and a hidden region which is visually obscured (i.e., cannot be visually observed) from the outside, and is configured so that the indicating portion is positioned in the hidden region when the pressure in the space is a pressure within a predetermined range, that is, a pressure with which the airtight state is judged to be good, and the indicating portion is positioned in the visible region when the pressure in the space is a pressure other than the pressure as described above, that is, a pressure with which the airtight state is judged to be bad.

When thus configured, while the indicating portion is positioned in the hidden region and cannot be observed from the outside when the airtight state is good, the indicating portion is moved to the visible region and becomes observable from the outside when the airtight state becomes bad. Therefore, it is possible to judge appropriateness of the airtight state by a simple checking operation of checking whether the indicating portion can be observed from the outside.

Further, the indicator may comprise a transparent or translucent cylindrical cylinder open at both ends, a piston as the indicating portion which is airtightly and movably disposed in the cylinder, and a biasing member which is disposed on one side or the other side of the piston within the cylinder and which biases the piston toward the one side or the other side, wherein:
the cylinder is airtightly inserted into a joined portion between the window plates of the window so that one side portion thereof is positioned in a visible region which is located within the space between the window plates and can be visually observed from the outside and the other side portion thereof leads to the outside of the window, and
the piston moves within the cylinder in accordance with the pressure in the space and thereby the position thereof is displaced.

According to this indicator, the pressure in the space acts on the piston at the one side thereof and atmospheric pressure acts on the piston at the other side thereof, and a basing force of the biasing member acts on the piston. Thus, the piston is caused to be positioned at a position where the acting force of the pressure in the space, the acting force of the atmospheric pressure and the biasing force are balanced.

When the pressure in the space varies, the piston is moved within the cylinder in accordance with this pressure variation and is displaced from the original position (its initial position) to a new position where the three forces are balanced. Therefore, also according to this indicator, it is possible to judge appropriateness of the airtight state by checking with eyes whether the piston is displaced from its initial position.

Also in this indicator, the piston may be configured to be movable between the visible region and a hidden region in which the piston is obscured from visual detection from an outside of the machine tool, and is configured so that the piston is positioned in the hidden region when the pressure in the space is a pressure within a predetermined range, that is, a pressure with which the airtight state is judged to be good, and the piston is positioned in the visible region when the pressure in the space is a pressure other than the pressure as described above, that is, a pressure with which the airtight state is judged to be bad. When thus configured, it is possible to judge appropriateness of the airtight state by a simple checking operation of checking whether the piston can be visibly detected from the outside of the machine tool.

Alternatively, the indicator may comprise:
a cylinder which comprises a transparent or translucent cylindrical member open at both ends and which is airtightly inserted into a jointed portion between the window plates of the window so that it communicates with the space between the window plates at one side and communicates with the outside of the window at the other side;
a piston which is airtightly and movably disposed in the cylinder;
an indicating plate as the indicating portion which is pivotably disposed within the space between the window plates; a link mechanism one end of which is engaged with the piston at the one side of the piston and the other end of which is engaged with the indicating plate and which causes the indicating plate to pivot in accordance with the movement of the piston; and
a biasing member which is disposed on the other side of the piston within the cylinder and which biases the piston toward the one side or the other side, wherein:
the indicating plate is provided so that at least a part thereof is able to pivot within a visible region which can be visually observed from the outside, and
the movement of the piston within the cylinder in accordance with the pressure in the space causes the indicating plate to pivot via the link mechanism, and thereby the position of the indicating plate within the visible region varies.

According to this indicator, the pressure in the space acts on the piston at the one side thereof and atmospheric pressure acts on the piston at the other side thereof, and a biasing force of the biasing member acts on the piston. Thus, the piston is caused to be positioned at a position where the acting force of the pressure in the space, the acting force of the atmospheric pressure and the biasing force are balanced.

When the pressure in the space varies, the piston moves within the cylinder in accordance with this pressure variation and is displaced from the original position (its initial position) to a new position where the three forces are balanced. The indicating plate is pivoted together with the displacement of the piston, and thereby the position of the indicating plate within the visible region varies. Therefore, it is possible to judge appropriateness of the airtight state by checking with eyes whether the position of the indicating plate within the visible region varies from the initial state.

It is noted that, in this indicator, the indicating plate may be configured so that the whole of the indicating plate is positioned within the hidden region when the pressure in the space is a pressure within a predetermined range, that is, a pressure with which the airtight state is judged to be good, and a part of the indicating plate may be positioned within the hidden region when the pressure in the space is a pressure other than the pressure as described above, that is, a pressure with which the airtight state is judged to be bad. When thus configured, it is possible to judge appropriateness of the airtight state by a simple checking operation of checking whether the indicating plate can be visually detected from the outside.

Further, the indicator may comprise a transparent or translucent cylindrical body one end of which communicates with the space between the window plates and the other end of which is sealed and which is disposed along the vertical direction, and a liquid as the indicating portion which is injected in the cylindrical body. According to this indicator, the position of the liquid within the cylindrical body varies in accordance with a force acting on the liquid, which is produced by the pressure in the space. Therefore, it is possible to judge appropriateness of the airtight state by checking with eyes whether the liquid is displaced from its initial position.

It is noted that, also in this indicator, the liquid may be able to be displaced between a visible region which can be visually detected from the outside and a hidden region which cannot be visually detected from the outside, the liquid may be positioned within the hidden region when the pressure in the space is a pressure within a predetermined range, that is, a pressure with which the airtight state is judged to be good, and the liquid may be positioned in the visible region when the pressure in the space is a pressure other than the pressure as described above, that is, a pressure with which the airtight state is judged to be bad. When thus configured, it is possible to judge appropriateness of the airtight state by a simple checking operation of checking whether the liquid can be observed from the outside.

Further, the indicator may have a configuration in which the indicator is connected to the cover body in a state of being connected to a communicating pipe communicating with the space between the window plates and the indicating portion is arranged so that it can always be visually detected from the outside.

Furthermore, the machine tool may have a pressure adjusting mechanism for adjusting the pressure in the space between the window plates. As for the airtight state of the window, it is in reality difficult to achieve a completely airtight state and leakage can occur within a range where there is no problem in practical use, which is allowable. However, if such leakage is left as it is, the judgment made on the basis of the indicating portion of the indicator is that the airtight state is bad, in the spite of the fact that the pressure variation does not interfere with the airtight state.

Therefore, by returning the pressure in the space between the window plates to the initial state by the pressure adjusting mechanism on a regular basis or on an irregular basis, it is possible to cancel the pressure variation within the range where there is no problem in practical use, and therefore appropriateness of the airtight state of the window can be judged more accurately.

As described above, it is possible to quickly and accurately determine appropriateness of an airtight state of a window comprising two window plates which are airtightly joined together with a certain distance between them by a simple operation of visibly observing an indicator. Therefore, in a case where a material having low resistance to coolant is used as the window plate disposed on the external side, it is possible to take a proper preventive measure, for example, replacing the window with a new one earlier, and taking such a preventive measure makes it possible to prevent a serious accident in which a tool or a workpiece penetrates the window and shoots out from being caused.

The summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

FIG. 10 is a cross-sectional view of an indicator according to a variation of the second embodiment;

FIG. 11 is a front view of a window and an indicator of a machine tool according to a third embodiment of the present disclosure;

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

So that the above features and advantages of the present disclosure can be understood in detail, a more particular description of the disclosure, briefly summarized above, may be had by reference to the embodiments thereof that are illustrated in the accompanying drawings. It is to be noted, however, that the drawings illustrate only typical embodiments of this disclosure and therefore are not to be considered limiting of its scope, for the disclosure may admit to other equally effective embodiments.

Hereinafter, specific embodiments of the present disclosure will be described with reference to the drawings.

Figure 1:
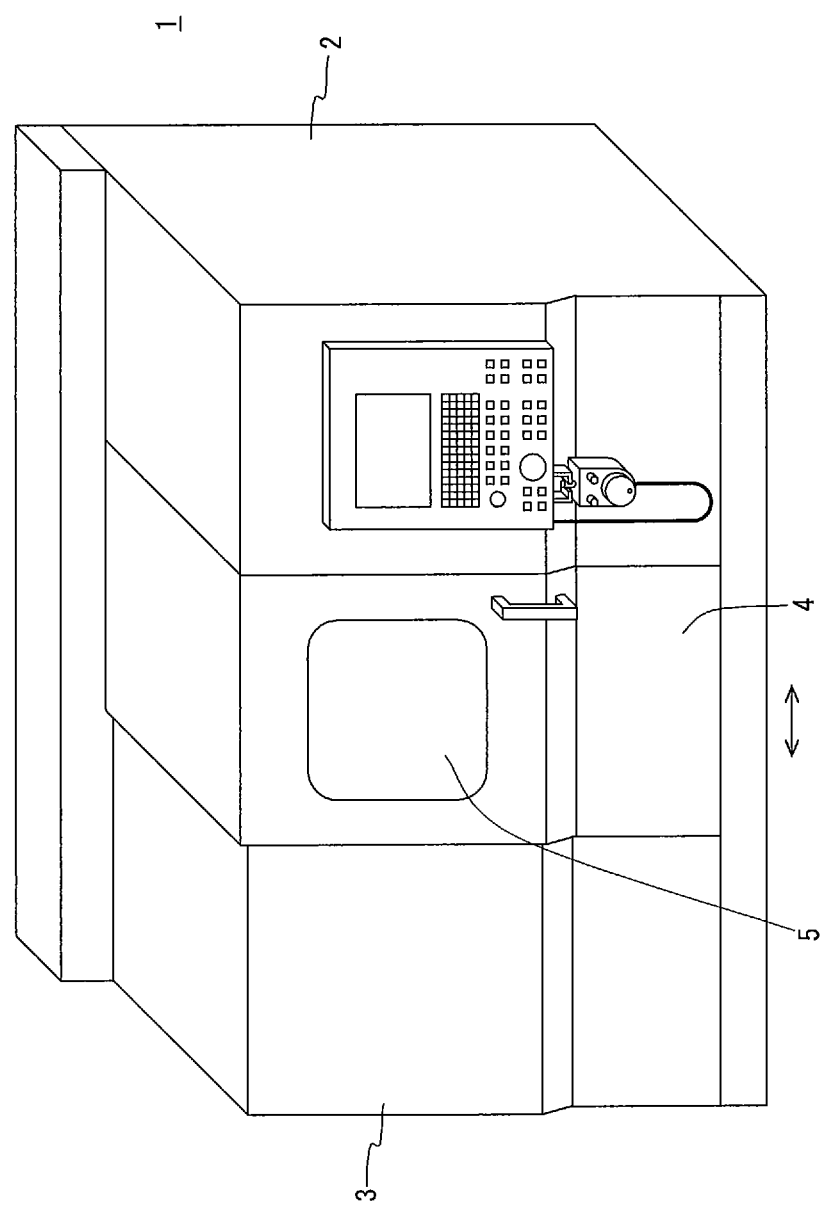
FIG. 1 is a perspective view of the whole of a machine tool according to a first embodiment of the present disclosure.
Figure 2:
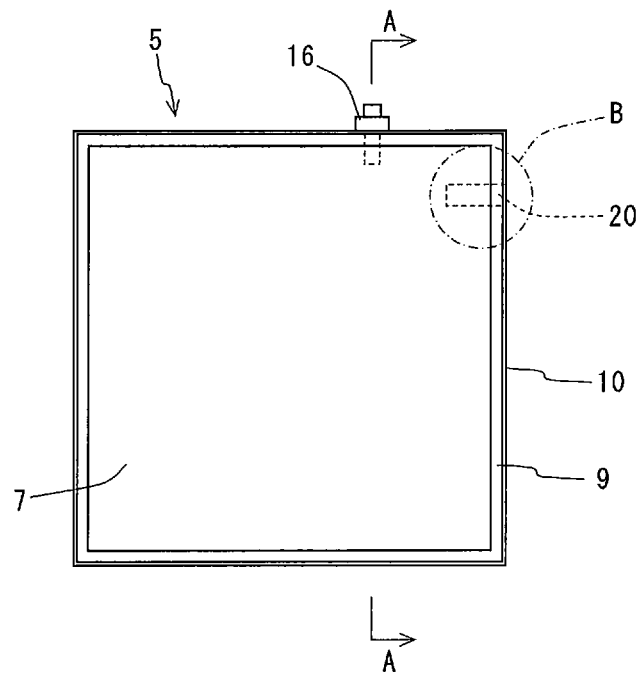
FIG. 2 is a front view of a window and an indicator according to the first embodiment.
Figure 3:
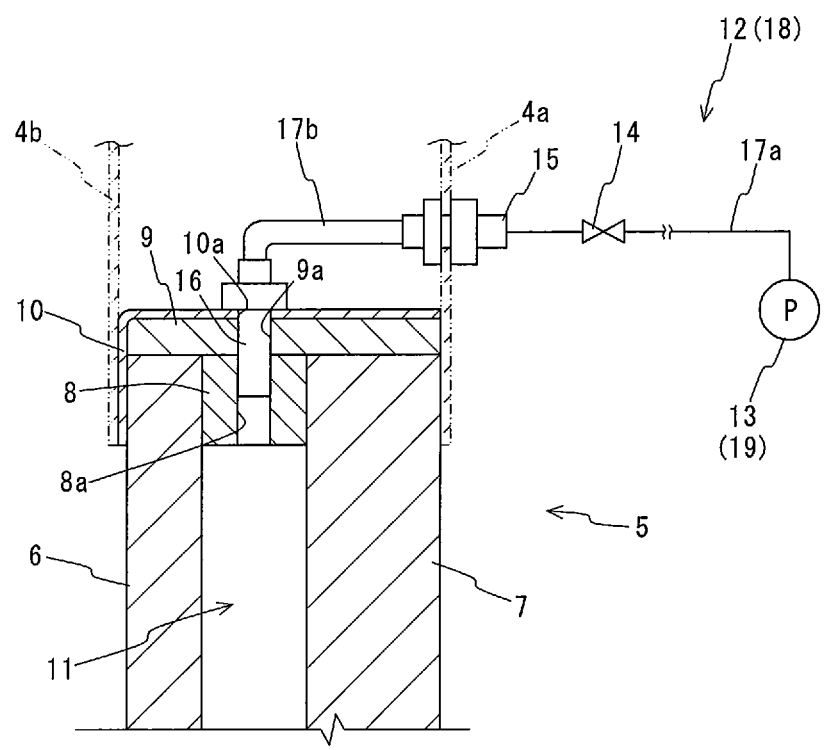
FIG. 3 is a partial cross-sectional view taken along the arrow A-A of FIG. 2.

FIG. 1 is a perspective view of the whole of a machine tool according to a first embodiment, FIG. 2 is a front view of a window and an indicator according to the first embodiment, and FIG. 3 is a partial cross-sectional view taken along the allow A-A of FIG. 2.

As shown in FIG. 1, a machine tool 1 of this embodiment is specifically an NC lathe, and its structures such as a bed, a headstock, a tool rest, etc. are covered by two fixed covers (cover bodies) 2, 3 and a door cover (cover body) 4 which is slidable in the directions indicated by the arrow, and the machine tool 1 has a structure in which a machining region is separated from the outside by the fixed covers 2, 3 and the door cover 4. The fixed covers 2, 3 are each made of a metal plate, and the door cover 4 has a window 5 and is made of a metal plate except for the window 5.

As shown in FIGS. 2 and 3, the window 5 comprises a glass plate 6 and a polycarbonate plate 7 which are transparent or translucent and have the same rectangular shape, and further comprises a spacer 8, a seal member 9 and a frame body 10. The spacer 8 is a rectangular frame-shaped member, and is disposed to be positioned at an outer peripheral edge portion between the glass plate 6 and the polycarbonate plate 7 to define a distance between them.

Further, the seal member 9 similarly comprises a rectangular frame-shaped member and is joined to the glass plate 6, the spacer 8 and the polycarbonate plate 7 to seal the outer peripheral surface of an assembly comprising the glass plate 6, the spacer 8 and the polycarbonate plate 7, which are integrally assembled to each other as shown in FIG. 3. Furthermore, the frame body 10 is a rectangular frame body having an L-shaped cross section, and is joined to the seal member 9 and the glass plate 6 so that it covers the outer peripheral surface and a side surface of the seal member 9 and a peripheral side surface of the glass plate 6.

Thus, the window 5 has a structure in which the glass plate 6 and the polycarbonate plate 7 are airtightly joined together with a certain distance between them. The window 5 having this structure is disposed between a plate member 4a and a plate member 4b, which constitute the door cover 4 and which are respectively arranged on the external side and the machining-region side, at an opening of the door cover 4 so that the glass plate 6 is positioned on the machining-region side, and the window 5 is fixed in a state where an outer peripheral edge portion thereof is held by the plate members 4a and 4b.

Further, the window 5 has through holes 8a, 9a, 10a formed in the spacer 8, the seal member 9 and the frame body 10, respectively, so that an opening is formed in an outer peripheral surface of the frame body 10, and a pressure adjusting device 12 is connected to the through holes 8a, 9a, 10a.

The pressure adjusting device 12 comprises a pressurizing pump 13, a pipe joint 15 which is attached to the plate member 4a of the door cover 4 in a state of passing therethrough, a pipe joint 16 which is connected to the through holes 8a, 9a and 10a, a connecting pipe 17a connecting the pressurizing pump 13 and the pipe joint 15, a connecting pipe 17b connecting the pipe joints 15 and 16, and a valve 14 which is intermediately provided in the connecting pipe 17a. A space 11 between the glass plate 6 and the polycarbonate plate 7 is pressurized by opening the valve 14 in a state where the pressurizing pump 13 is being driven, and the pipe line of the connecting pipe 17a is sealed by closing the valve 14, thereby maintaining the pressure in the space 11.

Figure 4:
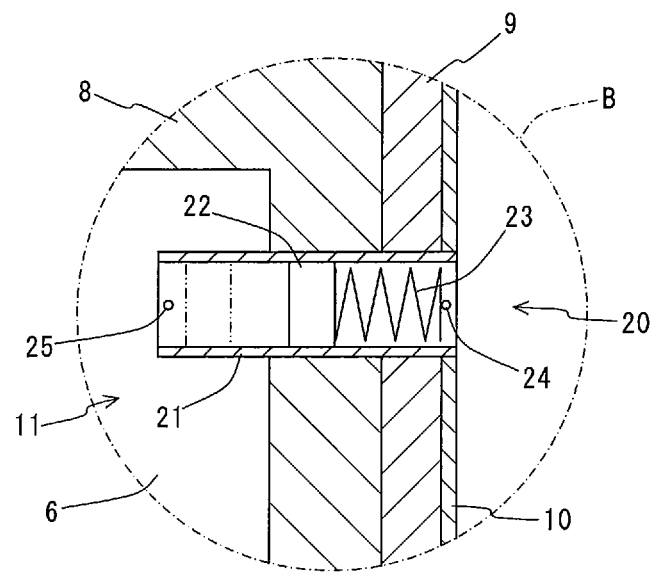
FIG. 4 is an enlarged cross-sectional view of the B portion of FIG. 2.

Further, an indicator 20 is disposed in the window 5. As shown in FIG. 4, the indicator 20 has a cylinder 21, a piston 22 and a helical compression spring 23. The cylinder 21 comprises a transparent or translucent cylindrical member open at both ends, and is disposed so that, at one side thereof, it airtightly passes through the spacer 8, the seal member 9 and the frame body 10 and is positioned within the space 11 between the glass plate 6 and the polycarbonate plate 7 and the portion within the space 11 can be observed through the polycarbonate plate 7 from the outside. On the other hand, the cylinder 21 communicates with the atmosphere at the other side thereof.

Further, the piston 22 is airtightly disposed in the cylinder 21 to be movable in the axial direction of the cylinder 21, and the helical compression spring 23 is disposed on the other side of the piston 22 within the cylinder 21 and biases the piston 22 toward the one side. It is noted that locking pieces 24, 25 are respectively provided in the ends of the cylinder 21, the locking piece 24 prevents the helical compression spring 23 from pulling out at the other side, and similarly the locking piece 25 prevents the piston 22 from pulling out at the one side.

Thus, in the indicator 20, the pressure in the space 11 acts an end surface of the piston 22 at the one side, and atmospheric pressure and a biasing force of the helical compression spring 23 act on an end surface of the piston 22 at the other side. The piston 22 functions as an indicating portion, and moves within the cylinder 21 in accordance with the differential between the acting force of the pressure in the space 11 and the resultant force of the acting force of the atmospheric pressure and the biasing force of the helical compression spring 23 and stops at a position where the forces are balanced.

It is noted that, in this embodiment, the piston 22 is positioned inside the space 8 (that is, in a hidden region) when the pressure in the space 11 is a pressure within an appropriate range (a pressure which is set on the basis of the initial pressure and with which the airtight state of the space 11 is judged to be good), and the piston 22 cannot be observed from the outside. On the other hand, when the pressure in the space 11 is lowered and becomes a pressure out of the appropriate range (a pressure with which the airtight state of the space 11 is judged to be bad), the piston 22 moves toward the one side and becomes observable through the polycarbonate plate 7 and the cylinder 21 from the outside.

According to the machine tool 1 of this embodiment having the above-described configuration, first, the space 11 is pressurized to a pressure higher than atmospheric pressure by the pressure adjusting device 12. When the space 11 has been brought into a pressurized state in this way, the pressure in the space 11 acts on the piston 22 of the indicator 20 and thereby the piston 22 moves toward the other side and is brought into an initial state where the piston 22 is positioned inside the spacer 8, that is, in the hidden region and obscured from view from the outside.

Thereafter, although, in the case where the airtight state of the window 5 is good, the pressure in the space 11 does not vary, in the case where the airtight state of the window 5 is not maintained, the pressure in the space 11 reduces and the piston 22 moves toward the one side in accordance with the reduction and becomes observable through the polycarbonate plate 7 and the cylinder 21 from the outside. That is, the piston 22 moves into a visible region. When the piston 22 becomes visually observable from the outside as described above, a judgment can be made that the airtight state of the window 5 is bad.

Thus, according to the machine tool 1 of this embodiment, it is possible to quickly and accurately judge appropriateness of the airtight state of the space 11 by a very simple checking operation of checking whether the piston 22 can be visually observed from the outside. Further, in the case where, similar to this embodiment, a polycarbonate plate having low resistance to coolant is used as the window plate disposed on the external side, it is possible to take a proper preventive measure, for example replacing the window 5 with a new one earlier, and taking such a preventive measure makes it possible to prevent a serious accident in which a tool or a workpiece penetrates the window and shoots out from being caused.

Figure 5:
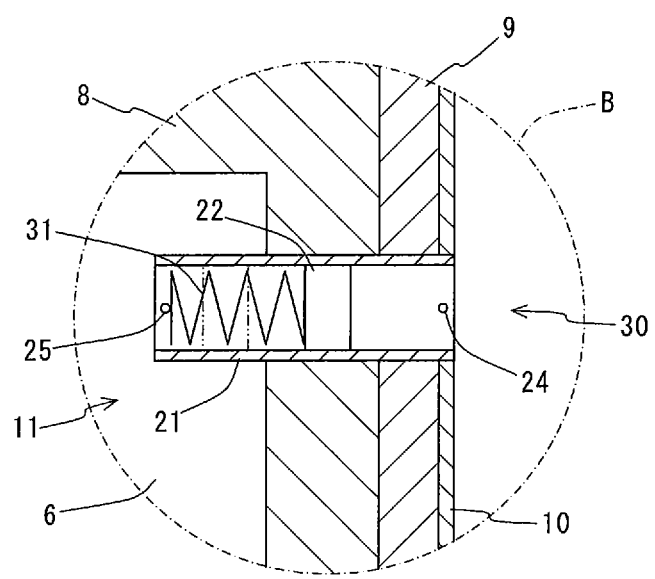
FIG. 5 is a cross-sectional view of an indicator according to a variation of the first embodiment.

It is noted that although the helical compression spring 23 is disclosed above as means for applying a biasing force to the piston 22 toward the one side, the means is not limited thereto, and an indicator 30 is possible in which, for example, as shown in FIG. 5, an helical extension spring 31 is provided on the one side of the piston 22 within the cylinder 21 and one end thereof is engaged with the locking piece 25 and the other end thereof is engaged with the piston 22. Also when thus configured, the piston 22 is biased toward the one side by a biasing force of the helical extension spring 31.

Further, although in this embodiment the pressure adjusting device 12 is provided with the pressurizing pump 13, the disclosure is not limited thereto and the pressure adjusting device 12 may be replaced by a pressure adjusting device 18 provided with a pressure-reducing pump 19 instead of the pressuring pump 13 and the pressure in the space 11 may be reduced to a negative pressure equal to or lower than atmospheric pressure by the pressure adjusting device 18. In this case, instead of the indicator 20, an indicator 35 shown in FIG. 6 or an indicator 40 shown in FIG. 7 is used.

Figure 6:
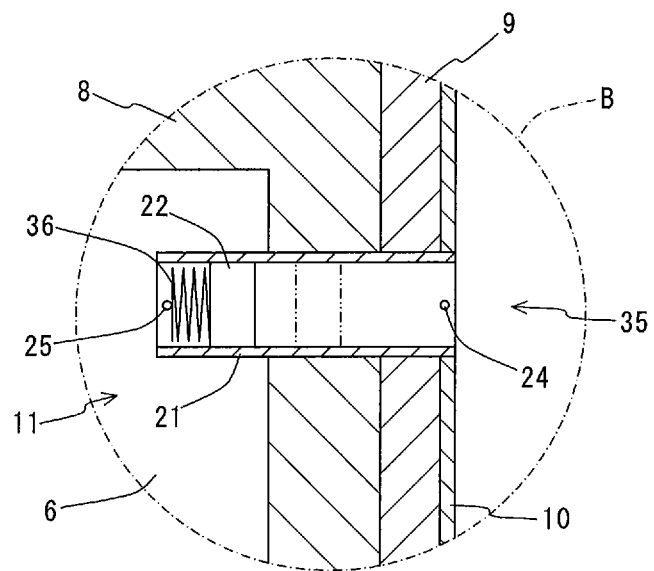
FIG. 6 is a cross-sectional view of an indicator according to a variation of the first embodiment.
Figure 7:
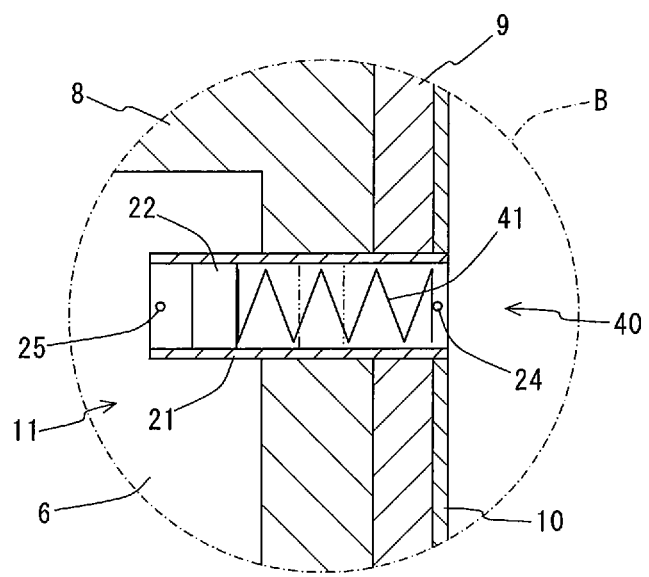
FIG. 7 is a cross-sectional view of an indicator according to a variation of the first embodiment.

The indicator 35 shown in FIG. 6 has a structure in which, instead of the helical compression spring 23 of the above indicator 20, a helical compression spring 36 is provided on the one side of the piston 22 within the cylinder 21. In the indicator 35, an acting force of the negative pressure in the space 11 and a biasing force of the helical compression spring 36 act on an end surface of the piston 22 at the one side and an acting force of atmospheric pressure acts on an end surface of the piston 22 on the other side. The piston 22 moves within the cylinder 21 in accordance with the differential between the resultant force of the acting force of the negative pressure in the space 11 and the biasing force of the helical compression spring 36 and the acting force of atmospheric pressure, and stops at a position where the forces are balanced.

It is noted that, in the indicator 35, the piston 22 moves toward the one side and can be observed through the polycarbonate plate 7 and the cylinder 21 from the outside when the pressure in the space 11 is equal to or lower than an appropriate pressure (which is set on the basis of the initial pressure and with which the airtight state of the space 11 is judged to be good), and, on the other hand, the piston 22 is positioned inside the spacer 8 and cannot be observed from the outside when the pressure in the space 11 increases and becomes a pressure higher than the appropriate pressure (a pressure with which the airtight state of the space 11 is judged to be bad).

Thus, in this case, first, the pressure in the space 11 is reduced to a negative pressure lower than atmospheric pressure by the pressure adjusting device 18. When the space 11 has been brought into a pressure-reduced state in this way, the negative pressure acts on the piston 22 of the indicator 35 and the piston 22 moves toward the one side and is brought into an initial state where the piston 22 can be observed from the outside.

When the airtight state of the window 5 is not maintained, the pressure in the space 11 increases and the piston 22 moves toward the other side in accordance with the increase and becomes unobservable from the outside. Thus, when the piston 22 becomes obscured from view from the outside as described above, it may indicate that the airtight state of the window 5 is unacceptable.

Further, the indicator 40 shown in FIG. 7 has a structure in which, instead of the helical extension spring 31 of the above indicator 30, a helical extension spring 41 is provided on the other side of the piston 22 within the cylinder 21, and one end thereof is engaged with the piston 22 and the other end thereof is engaged with the locking piece 24. Also according to this structure, the piston 22 is biased toward the other side by a biasing force of the helical extension spring 41, thereby achieving the same operation as the indicator 35 does.

In the case where the space 11 is brought into a pressure-reduced state, when a leak portion is present in the window 5 and therefore the airtightness thereof is not secured, the outside gas is sucked into the space 11 through the leak portion, and if coolant is present near the leak portion, the coolant is sucked into the space 11 through the leak portion. On the other hand, in the case where the space 11 is brought into a pressurized state, even if a leak portion is present, because the gas within the space 11 is discharged through the leak portion, coolant never enters the space 11 through the leak portion even if present near the leak portion. In this respect, the space 11 may be brought into a pressurized state.

Furthermore, in the indicators 20, 30, 35, 40, the piston 22 may be provided so that it is always positioned within the space 11 and can always be observed from the outside. In this case, it is possible to judge appropriateness of the airtight state of the space 11 by comparing the position of the piston 22 which varies in accordance with the pressure in the space 11 with its initial position.

Figure 8:
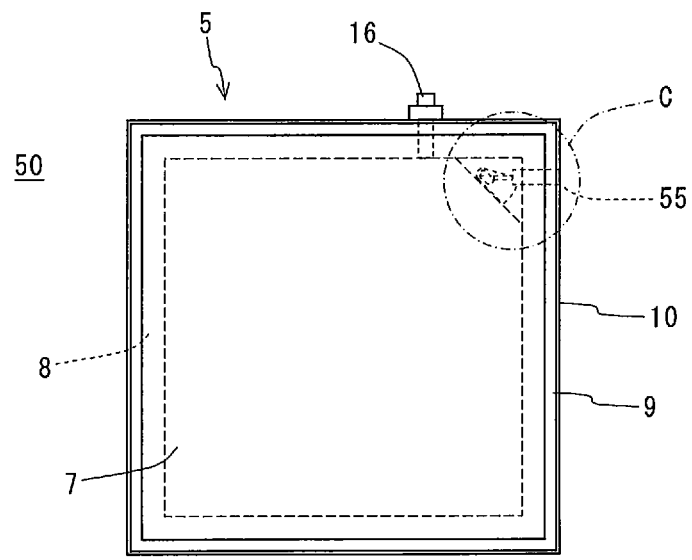
FIG. 8 is a front view of a window and an indicator of a machine tool according to a second embodiment of the present disclosure.
Figure 9:
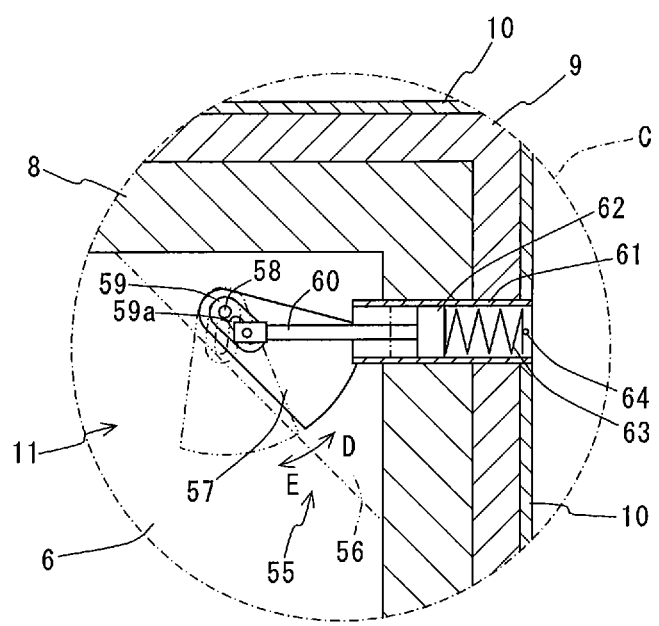
FIG. 9 is an enlarged cross-sectional view of the C portion of FIG. 8.

FIG. 8 is a front view of a window and an indicator of a machine tool according to a second embodiment of the present disclosure, and FIG. 9 is an enlarged cross-sectional view of the C portion of FIG. 8. As shown in FIGS. 8 and 9, a machine tool 50 according to the second embodiment has a structure in which, instead of the indicator 20 according to the first embodiment, an indicator 55 having a structure different from that of the indicator 20 is provided on the window 5.

As shown in FIG. 9, the indicator 55 comprises a shielding plate 56, an indicating plate 57, a first link 59, a second link 60, a cylinder 61, a piston 62, a helical compression spring 63 and other components, and the shielding plate 56 is made of an opaque member having a triangular shape in font view and is disposed at a corner portion of the inner periphery of the spacer 8. Further, the indicating plate 57 is made of an almost fan-shaped plate member and is disposed on the glass plate 6 side of the shielding plate 56, that is, behind the shielding plate 56, and is supported by a support shaft 58 to be able to pivot in the directions indicated by the arrow D-E, and is pivoted between a position where the whole of the indicating plate 57 is positioned behind the shielding plate 56 (the position indicated by the solid line in FIG. 9) and a position where a part of the indicating plate 57 is positioned outside the shielding plate 56 (the position indicated by the two-dot chain line in FIG. 9).

The cylinder 61 comprises a cylindrical member open at both ends and is disposed in the window 5 in a state of airtightly passing through the spacer 8, the seal member 9 and the frame body 10, and communicates with the space 11 between the glass plate 6 and the polycarbonate plate 7 at its end on one side and communicates with the atmosphere at its end on the other side.

Further, the piston 62 is airtightly disposed in the cylinder 61 so that it is movable in the axial direction of the cylinder 61, and the helical compression spring 63 is disposed on the other side of the piston 62 within the cylinder 61 and biases the piston 62 toward the one side. Further, the cylinder 61 has a locking piece 64 provided therein at its end on the other side and the locking piece 64 prevents the helical compression spring 63 from pulling out at the other side.

One end of the first link 59 is fixed to the support shaft 58, and one end of the second link 60 is engaged with a long hole 59a formed in the first link 59 and the other end of the second link 60 is fixed to an end surface of the piston 62 on the one side. The first and second links 59, 60 together function as a link mechanism for pivoting the indicating plate 57.

Thus, in the machine tool 50, first, the space 11 is pressurized to a pressure equal to or higher than atmospheric pressure by the pressure adjusting device 12. When the space 11 has been pressurized to a pressure equal to or higher than atmospheric pressure, the pressure in the space 11 acts on the end surface of the piston 62 on the one side, and on the other hand atmospheric pressure and a biasing force of the helical compression spring 63 act on an end surface of the piston 62 on the other side, and the piston 62 moves within the cylinder 61 in accordance with the differential between the acting force of the pressure in the space 11 and the resultant force of the acting force of the atmospheric pressure and the biasing force of the helical compression spring 63, and stops at a position where the forces are balanced.

Further, when the piston 62 moves, the indicating plate 57 is pivoted in the directions indicated by the arrows D-E on the support shaft 58 due to the engagement relationship between the first link 59 and the second link 60. In this embodiment, when the pressure in the space 11 is in the initial state, the indicating plate 57 is pivoted in the direction indicated by the arrow D and the whole of the indicating plate 57 is positioned behind the shielding plate 56 and cannot be visually observed from the outside.

When the airtight state of the space 11 is bad and the pressure in the space 11 is therefore lowered, the piston 62 moves toward the one side, and thereby the indicating plate 57 is pivoted in the direction indicated by the arrow E and moves toward the outside of the shielding plate 56, and the indicating plate 57 becomes partially observable through the polycarbonate plate 7 and the cylinder 61 from the outside.

Thus, also according to the indicator 55 of this embodiment, when the indicating plate 57 becomes observable through the polycarbonate plate 7 and the cylinder 61 from the outside, a judgment can be made that the airtight sate of the window 5 is bad.

It is noted that, also in this second embodiment, the pressure in the space 11 may be reduced to a negative pressure by the pressure adjusting device 18. A machine tool 65 used in the case where the space 11 is brought into a pressure-reduced state has an indicator 70 shown in FIG. 10 instead of the indicator 55.

Figures 10, 11:
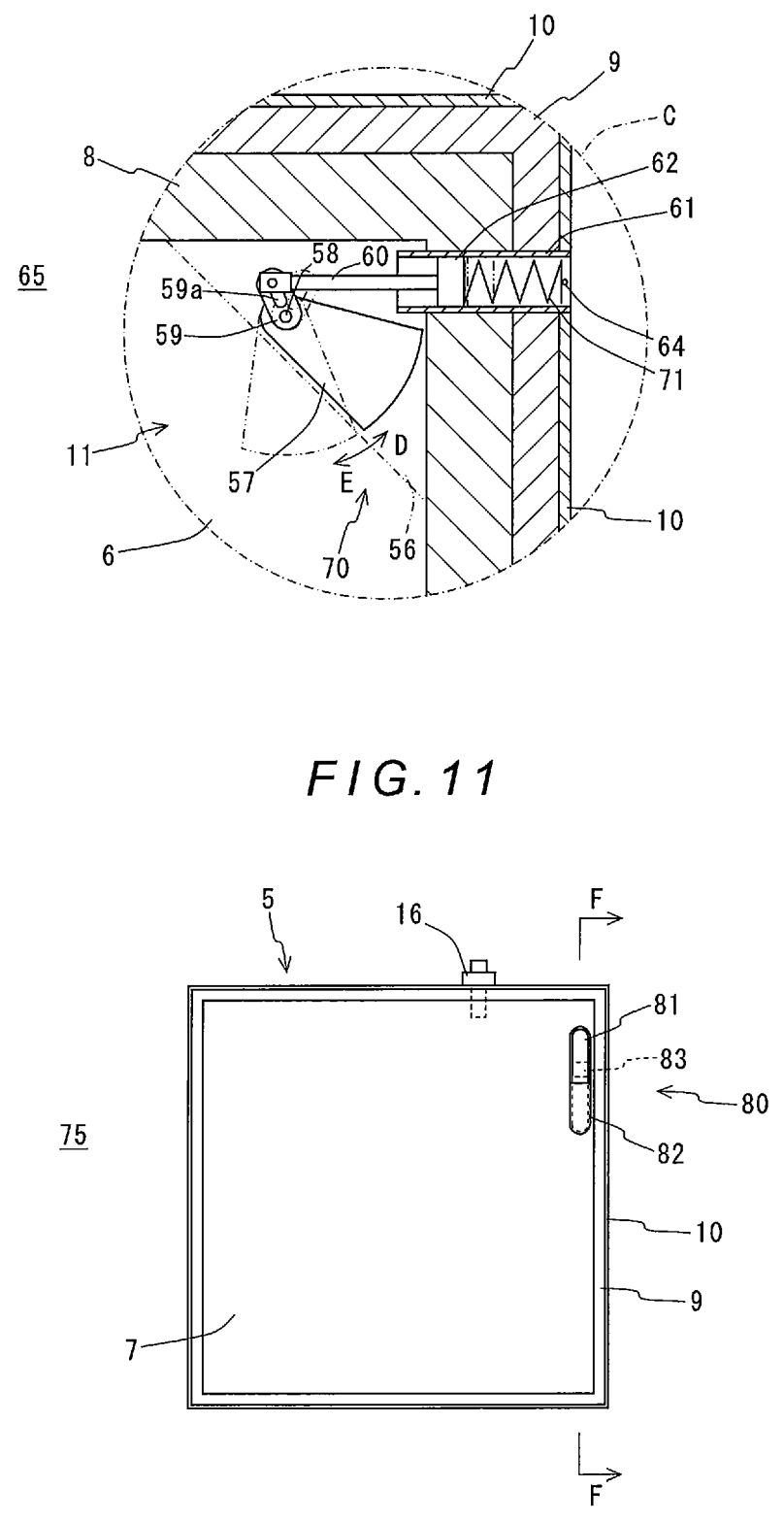

As shown in FIG. 10, in the indicator 70, the first link 59 is fixed to the support shaft 58 so that the indicating plate 57 is pivoted in the direction indicated by the arrow D when the piston 62 moves toward the one side, and the indicating plate 57 is pivoted in the direction indicated by the arrow E when the piston 62 moves toward the other side.

Further, in the cylinder 61, an helical extension spring 71 is provided instead of the helical compression spring 63, and one end thereof is engaged with the piston 62 and the other end thereof is engaged with the locking piece 64.

In the machine tool 65, first, the pressure in the space 11 is reduced to a negative pressure equal to or lower than atmospheric pressure by the pressure adjusting device 18. When the pressure in the space 11 has been reduced to a negative pressure, the pressure in the space 11 acts on an end surface of the piston 62 on the one side, and on the other hand atmospheric pressure and a tensile force (biasing force) of the helical extension spring 71 act on an end surface of the piston 62 on the other side, and the piston 62 moves within the cylinder 61 in accordance with the differential between the acting force of the pressure in the space 11 and the resultant force of the acting force of the atmospheric pressure and the biasing force of the helical extension spring 71, and stops at a position where the forces are balanced.

Further, when the piston 62 moves, the indicating plate 57 is pivoted in the directions indicated by the arrows D-E on the support shaft 58 due to the engagement relationship between the first link 59 and the second link 60. Also in the indicator 70, when the pressure in the space 11 is in the initial state, the indicating plate 57 is pivoted in the direction indicated by the arrow D and the whole of the indicating plate 57 is positioned behind the shielding plate 56 and cannot be visually observed from the outside.

When the airtight state of the space 11 becomes sufficiently poor such that the pressure in the space 11 increases to an unacceptable level, the piston 62 moves toward the other side, and thereby the indicating plate 57 is pivoted in the direction indicated by the arrow E and moves toward the outside of the shielding plate 56, and becomes partially observable through the polycarbonate plate 7 and the cylinder 61 from the outside.

Thus, also according to the machine tool 65, when the indicating plate 57 becomes observable through the polycarbonate plate 7 and the cylinder 61 from the outside, a judgment can be made that the airtight state of the window 5 is insufficient.

Further, for the same reasons as those described above, also in the second embodiment, the space 11 may be brought into a pressurized state.

Furthermore, in the indicators 55, 70, the indicating plate 57 may be configured so that a part or the whole of the indicating plate 57 can always be observed through the polycarbonate plate 7 and the cylinder 61 from the outside. In this case, it is possible to judge appropriateness of the airtight state of the space 11 by comparing the position of the indicating plate 57 which is pivoted in accordance with the pressure in the space 11 with its initial position.

Figure 12:
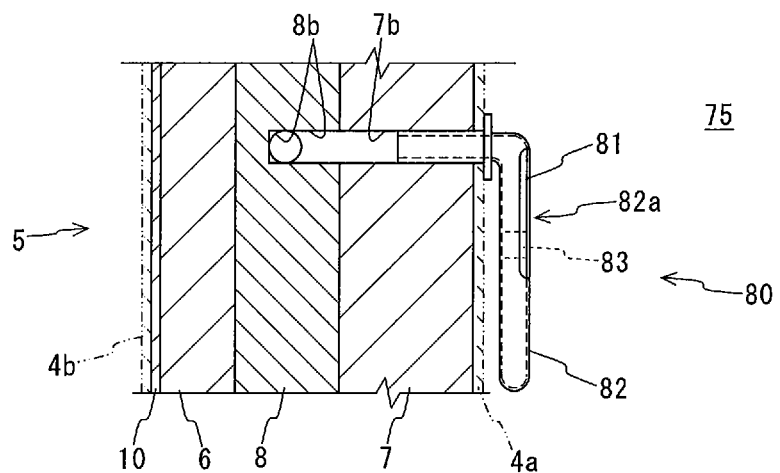
FIG. 12 is a partial cross-sectional view taken along the arrow F-F of FIG. 11.

FIG. 11 is a front view of a window and an indicator of a machine tool according to a third embodiment of the present disclosure, and FIG. 12 is a partial cross-sectional view taken along the arrow F-F of FIG. 11. As shown in FIGS. 11 and 12, a machine tool 75 according to the third embodiment has a structure in which, instead of the indicator 20 of the first embodiment, an indicator 80 having a structure different from that of the indicator 20 is provided on the window 5.

As shown in FIG. 12, the indicator 80 comprises a transparent or translucent cylindrical body 81 having an upside-down L shape, which comprises a horizontal portion and a vertical portion, a cover portion 82 having a similar upside-down L shape for covering the cylindrical body 81, and a liquid 83 as an indicating portion, which is injected in the cylindrical body 81. The horizontal portions of the cylindrical body 81 and the cover portion 82 are airtightly joined to each other, and end portions thereof penetrate the plate member 4a and are airtightly inserted into a through hole 7b formed in the polycarbonate plate 7. Further, the spacer 8 also has a through hole 8b formed to be open to the space 11, and the through hole 8b communicates with the through hole 7b.

An end portion of the vertical portion (lower end portion) of the cylindrical body 81 is sealed and the liquid 83 is injected in the vertical portion of the cylindrical body 81. On the other hand, the end portion of the horizontal portion of the cylindrical body 81 is open and the pressure in the space 11 acts on the top surface of the liquid 83 through the through holes 7b and 8b. Further, the cover portion 82 has an opening 82a formed in an upper portion thereof and the cylindrical body 81 can be visually observed through the opening 82a.

According to the machine tool 75 of the third embodiment, first, the space 11 is pressurized to a pressure equal to or higher than atmospheric pressure by the pressure adjusting device 12. Thereby, the pressure in the space 11 acts on the top surface of the liquid 83 through the through holes 7b, 8b and presses the liquid 83 downward. On the other hand, a space below the liquid 83 is sealed and the pressure in the sealed space is increased by the downward movement of the liquid 83, and the liquid 83 stops at a position where the pressure in the space 11 acting on the top surface of the liquid 83 and the pressure in the sealed space are balanced.

Although, as described above, the opening 82a is provided in the cover portion 82 and the cylindrical body 81 and the liquid 83 can be visually observed through the opening 82a, in the initial state where the space 11 has been pressurized, the liquid 83 is positioned below the opening 82a and is positioned at a position where it cannot be visually observed from the outside, that is, in a hidden region.

When the airtight state of the window 5 becomes bad, the pressure in the space 11 reduces and the liquid 83 moves upward in accordance with the reduction, and as a result thereof the liquid 83 becomes visually observable through the opening 82a. Thus, when the liquid 83 becomes visually observable from the outside as described above, a judgment can be made that the airtight state of the window 5 is bad.

It is noted that, also in the machine tool 75, the pressure in the space 11 may be reduced to a negative pressure equal to or lower than atmospheric pressure by the pressure adjusting device 18. In this case, the liquid 83 is sucked and moves upward due to the difference between the pressure in the space 11 acting on the top surface of the liquid 83 through the through holes 7b, 8b and the pressure in the sealed space below the liquid 83. The pressure in the sealed space is reduced by the upward movement of the liquid 83, and the liquid 83 stops at a position where the pressure in the space 11 acting on the top surface of the liquid 83 and the pressure in the sealed space are balanced.

In this mode in which the space 11 is brought into a pressure-reduced state, the opening 82a is provided in a lower portion of the cover portion 82, and in the initial state the liquid 83 is positioned in a hidden region located above the opening 82a. When the airtight state of the window 5 becomes bad, the pressure in the space 11 increases and the liquid 83 moves downward in accordance with the increase, and as a result thereof the liquid 83 becomes visually observable through the opening 82a. Thus, also in this mode, when the liquid 83 becomes visually observable from the outside, a judgment can be made that the airtight state of the window 5 is bad.

It is noted that, in the third embodiment, that the liquid 83 may be a liquid in which air can be hardly dissolved, such as mercury. Further, for the same reasons as those described above, also in the third embodiment, the space 11 may be brought into a pressurized state.

Furthermore, in the above-described mode, the vertical portion of the indicator 80 as shown in FIGS. 11 and 12 may be turned upside down so that the sealed side is placed on the upper side. In this case, the opening 82a may be formed in a lower portion of the cover body 82 in the case where the space 11 is brought into a pressurized state, and may be formed in an upper portion of the cover body 82 in the case where the space 11 is brought into a pressure-reduced state.

Further, the indicator 80 may be configured so that the liquid 83 can always be observed from the outside. In this case, it is possible to judge appropriateness of the airtight state of the space 11 by comparing the position of the liquid 83 which is displaced in accordance with the pressure in the space 11 with its initial position.

Figure 13:
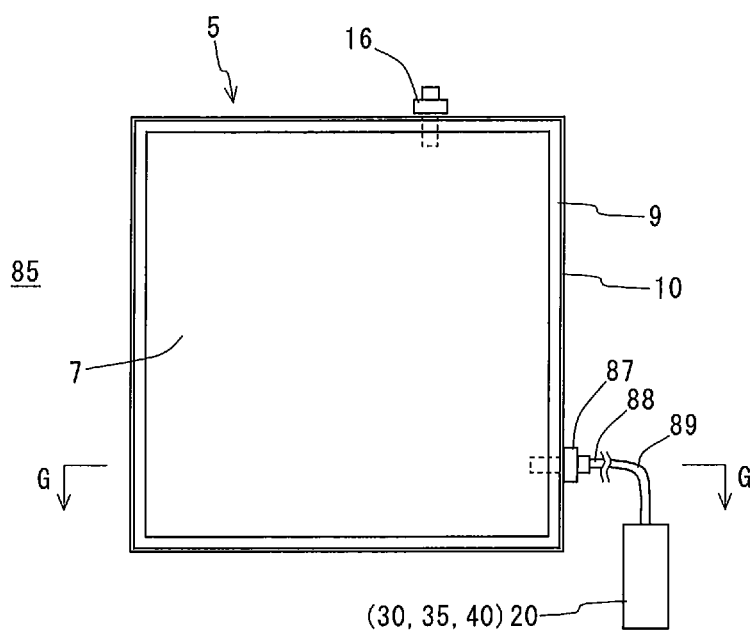
FIG. 13 is a front view of a window and an indicator of a machine tool according to a fourth embodiment of the present disclosure.
Figure 14:
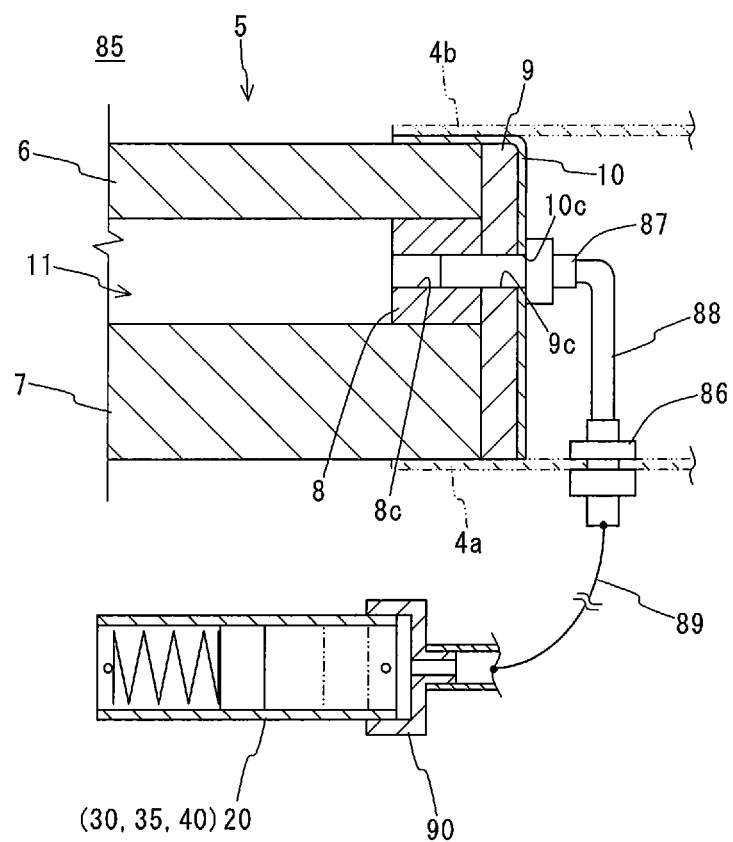
FIG. 14 is a partial cross-sectional view taken along the arrow G-G of FIG. 13.

FIG. 13 is a front view of a window and an indicator of a machine tool according to a fourth embodiment of the present disclosure, and FIG. 14 is a partial cross-sectional view taken along the arrow G-G of FIG. 13. As shown in FIGS. 13 and 14, a machine tool 85 according to the fourth embodiment has a structure in which the indicator 20 of the first embodiment is connected to the space 11 of the window 5 via communicating pipes 88, 89.

The space 8, the seal member 9 and the frame body 10 have through holes 8c, 9c, 10c formed therein, respectively, and a pipe joint 87 is airtightly inserted into the through holes 8c, 9c, 10c. Further, a pipe joint 86 is fixed to the plate member 4a of the door cover 4 in a state of passing therethrough. One end of the communicating pipe 88 is connected to the pipe joint 87 and the other end thereof is connected to one end portion of the pipe joint 86 which is positioned between the plate members 4a and 4b.

One end of the communicating pipe 89 is connected to the other end portion of the pipe joint 86 and the other end of the communicating pipe 89 is connected to one side end portion of the indicator 20 via a joint 90.

Thus, in the machine tool 85, the indicator 20 is connected to the space 11 via the joint 90, the communicating pipe 89, the pipe joint 86, the communicating pipe 88 and the pipe joint 87, and the pressure in the space 11 acts on the piston 22 of the indicator 20. Further, the indicator 20 is disposed outside the door cover 4.

In the indicator 20, the position of the piston 22 moves in accordance with the pressure in the space 11 and the piston 22 can always be observed from the outside. Therefore, it is possible to judge appropriateness of the airtight state of the space 11 by checking with eyes whether the position of the piston 22 is displaced from its initial position.

It is noted that the behavior of the indicator 20 in accordance with the pressure in the space 11 is the same as described above, and therefore detailed explanation thereof is omitted.

Further, in the case where the space 11 is brought into a pressurized state, the indicator 30 may be used instead of the indicator 20. Furthermore, in the case where the space 11 is brought into a pressure-reduced state, the indicator 35 or the indicator 40 may be used instead of the indicator 20. However, also in the fourth embodiment, for the same reasons as those described above, the space 11 may be brought into a pressurized state.

Thus, some embodiments of the present disclosure have been described. However, the mode of embodying the present disclosure is not limited thereto.

For example, although the window 5 provided on the door cover 4 of the machine tool 1, 50, 65, 75, 85 was exampled in the above embodiments, the present disclosure is not limited thereto and can be applied to a window 5 provided on the fixed covers 2, 3. Further, the type of the machine tool is not limited to the NC lathe as described above.

Further, although a window having a glass plate disposed on the machining-region side and a polycarbonate plate disposed on the external side was exampled as the window 5, the structure of the window is not limited thereto and the present disclosure may be applied to a window 5 having a structure in which a material having high wear resistance is used as the window plate disposed on the machining-region side and a material having high toughness and high impact resistance but having low resistance to coolant is used as the window plate disposed on the external side. Furthermore, the present disclosure can be applied regardless to the materials of the two window plates constituting the window 5 as long as the purpose thereof is to detect the airtight state of the space between the two window plates.

Furthermore, as for the airtight state of the window 5, it is in reality difficult to achieve a completely airtight state and leakage can occur in a range where there is no problem in practical use, which is allowable. Therefore, the pressure in the space 11 may be returned to the initial state on a regular basis or on an irregular basis by the pressure adjusting device 12, 18. In this way, it is possible to cancel the pressure variation within the range where there is no problem in practical use and judge appropriateness of the airtight state of the window 5 accurately.

Although only a few example embodiments have been described in detail above, those skilled in the art will readily appreciate that many modifications are possible in the example embodiments without materially departing from the burner assembly and methods for flaring low calorific content gases disclosed and claimed herein. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

What is claimed is:

1. A machine tool comprising:
   a cover body with a window, the window including two transparent or translucent window plates which are airtightly coupled together, the two window plates being spaced by a predetermined distance to define a space therebetween, the space being set to a pressure other than atmospheric pressure; and
   an indicator having an indicating portion which is displaced in accordance with pressure disposed on or connected to the cover body so that the pressure in the space acts on the indicating portion and the indicating portion can be visually observed from the outside.

2. The machine tool of claim 1, in which:
   the indicating portion is configured to be movable between a visible region which can be visually observed from the outside and a hidden region which cannot be visually observed from the outside; and
   the indicating portion is positioned in the hidden region when the pressure in the space is a pressure within a predetermined range.

3. The machine tool of claim 1, in which:
   the indicator comprises a transparent or translucent cylindrical cylinder open at both ends, a piston as the indicating portion which is airtightly and movably disposed in the cylinder, and a biasing member which is disposed on one side or the other side of the piston within the cylinder, and which biases the piston toward the one side or the other side;
   the cylinder is airtightly inserted into a joined portion between the window plates of the window so that one side portion thereof is positioned in a visible region which is located within the space between the window plates and can be visually observed from the outside and the other side portion thereof leads to the outside of the window; and
   the piston moves within the cylinder in accordance with the pressure in the space and thereby the position thereof is displaced.

4. The machine tool of claim 3, in which:
   the piston is configured to be movable between the visible region and a hidden region which cannot be visually observed from the outside, and
   the piston is positioned in the hidden region when the pressure in the space is a pressure within a predetermined range.

5. The machine tool of claim 1, in which:
   the indicator includes:
   a cylinder which comprises a transparent or translucent cylindrical member open at both ends and which is airtightly inserted into a jointed portion between the window plates of the window so that it communicates with the space between the window plates at one side and leads to the outside of the window at the other side;
   a piston which is airtightly and movably disposed in the cylinder;
   an indicating plate as the indicating portion which is pivotably disposed within the space between the window plates;
   a link mechanism one end of which is engaged with the piston at the one side of the piston and the other end of which is engaged with the indicating plate and which causes the indicating plate to pivot in accordance with the movement of the piston; and
   a biasing member which is disposed on the other side of the piston within the cylinder and which biases the piston toward the one side or the one side;
   wherein the indicating plate is provided so that at least a part thereof is able to pivot within a visible region which can be visually observed from the outside; and
   wherein the movement of the piston within the cylinder in accordance with the pressure in the space causes the indicating plate to pivot via the link mechanism, and thereby the position of the indicating plate within the visible region varies.

6. The machine tool of claim 5, in which the indicating plate is configured so that the whole of the indicating plate is positioned within the hidden region when the pressure in the space is a pressure within a predetermined range.

7. The machine tool of claim 1, in which the indicator comprises a transparent or translucent cylindrical body one end of which communicates with the space between the window plates, the other end of which is sealed, and which is disposed along the vertical direction, and a liquid as the indicating portion which is injected in the cylindrical body.

8. The machine tool of claim 7, in which:
   the liquid is able to be displaced between a visible region which can be visually observed from the outside and a hidden region which cannot be visually observed from the outside; and
   the liquid is positioned within the hidden region when the pressure in the space is a pressure within a predetermined range.

9. The machine tool of claim 1, in which:
the machine tool further has a communicating pipe communicating with the space between the window plates;
the indicator is connected to the cover body in a state of being connected to the communicating pipe; and
the indicating portion is arranged so that it can be always visually observed from the outside.

10. The machine tool of claim 1, further comprising a pressure adjusting mechanism for adjusting the pressure in the space between the window plates.

\* \* \* \* \*